(12) United States Patent
Becker et al.

(10) Patent No.: US 7,793,582 B2
(45) Date of Patent: Sep. 14, 2010

(54) SWASH PLATE PIVOT BEARING

(75) Inventors: Klaus Becker, Herzogenaurach (DE); Harald Vornehm, Ammerndorf (DE); Andreas Lorz, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 389 days.

(21) Appl. No.: 11/913,859

(22) PCT Filed: Apr. 7, 2006

(86) PCT No.: PCT/EP2006/003185

§ 371 (c)(1),
(2), (4) Date: Nov. 8, 2007

(87) PCT Pub. No.: WO2006/122613

PCT Pub. Date: Nov. 23, 2006

(65) Prior Publication Data

US 2009/0126561 A1 May 21, 2009

(30) Foreign Application Priority Data

May 20, 2005 (DE) ........................ 10 2005 023 275

(51) Int. Cl.
*F01B 3/00* (2006.01)
(52) U.S. Cl. ...................................... 92/12.2
(58) Field of Classification Search ................... 91/505; 92/12.2, 71; 384/550
See application file for complete search history.

(56) References Cited

U.S. PATENT DOCUMENTS

| 511,963 | A | * | 1/1894 | Lutz ........................ 384/550 |
| 874,119 | A | * | 12/1907 | Sackett ..................... 384/550 |
| 2,208,041 | A | | 7/1940 | Norin |
| 3,938,865 | A | | 2/1976 | Rouverol |
| 4,085,980 | A | * | 4/1978 | Traut ........................ 384/550 |
| 4,292,859 | A | | 10/1981 | Teraura |
| 4,627,330 | A | * | 12/1986 | Beck, Jr. .................... 92/12.2 |
| 4,856,917 | A | * | 8/1989 | Schroder et al. ............. 92/12.2 |
| 4,858,480 | A | * | 8/1989 | Rohde et al. ................ 92/12.2 |
| 4,884,902 | A | * | 12/1989 | Kispert et al. ............... 92/12.2 |
| 5,390,584 | A | * | 2/1995 | Fritz et al. .................. 92/12.2 |
| 5,630,352 | A | | 5/1997 | Todd |
| 6,676,294 | B2 | * | 1/2004 | Harimoto et al. ............ 92/12.2 |

(Continued)

FOREIGN PATENT DOCUMENTS

CH 284552 12/1952

(Continued)

*Primary Examiner*—Michael Leslie
(74) *Attorney, Agent, or Firm*—Volpe and Koenig, P.C.

(57) ABSTRACT

A swash plate pivot bearing is provided having roller bearing segments (15) arranged between a hollow cylindrical bearing surface (12) for a swash plate (10) in a housing (3) and a cylindrical bearing surface (11) on the swash plate (10), held in curved cages (17) whereby elements are provided for controlling the cages which prevent the cage (17) accommodating the roller body (16) from slipping out from the optimum position thereof in the pivot bearing. The cage control elements are integrated into the roller bearing segments (15) so that at least one roller body (23, 23.1, 23.2) of cylindrical form has a positive engagement with the hollow cylindrical bearing surface (12) and the cylindrical bearing surface (11). It is thus possible to prevent the escape of roller bearing segments (15) from the bearing gap (22) due to the effects of vibration.

7 Claims, 7 Drawing Sheets

U.S. PATENT DOCUMENTS

2002/0136475 A1    9/2002    Harimoto et al.

FOREIGN PATENT DOCUMENTS

| | | |
|---|---|---|
| DE | 1653617 | 3/1953 |
| DE | 1909845 | 2/1965 |
| DE | 2521312 | 7/1976 |
| DE | 2826928 | 1/1980 |
| EP | 0182354 | 4/1989 |
| FR | 911385 | 7/1946 |

* cited by examiner

SWASH PLATE PIVOT BEARING

BACKGROUND

The invention is directed to a swash plate pivot bearing, in particular, for a hydraulic axial piston machine with a variable throughput volume, in which roller-bearing segments are arranged between a hollow-cylindrical bearing surface for a swash plate in a housing and a cylindrical bearing surface on the swash plate. These roller-bearing segments are held in arcuate cages, wherein means for controlling the cage are provided, which prevent the cage holding the roller body from sliding out of its most favorable position in the pivot bearing.

Axial piston hydraulic units with variable displacement or variable flow rate use a pivoting swash plate, in order to control the displacement or flow rate of the piston within a rotating cylinder block. A typical type of pivoting swash plate is the cradle-type swash plate, which is held in a housing so that it can pivot by via arcuate roller-bearing segments. For this known construction, a tracking device, which prevents the cage holding the roller body from sliding out of its range of motion set for it, namely from its most favorable position in the pivot bearing, is allocated to the swash plate pivot bearing. If there is no tracking device, such slipping is possible, because the roller bodies perform not only rolling motions, but also sliding motions due to fast pivoting movements and/or vibrations and/or the inertia of the roller-bearing segment, which lead to shifts in the position of the roller-bearing segment. This produces an unfavorable position of the bearing segment or segments towards the load direction.

To drive the roller-bearing segments so that they respond to the movement of the swash plate and so that they are moved by the desired degree, in order to guarantee correct roller contact and loading for distribution, the following tracking devices are known:

For example, in DE 25 21 312 B1, a swash plate pivot bearing is described, which is distinguished in that on each cage, an elastic rod extending approximately radial to the curvature of the arcuate cage can shift in the radial direction and is hinged so that it can pivot and the rod is supported so that it can pivot with one end fixed in position at one point of the housing and can pivot with its other end on the swash plate and is arranged so that it can move in its longitudinal direction. Other similar tracking devices are described in DE 28 26 928 A1 and in EP 0 182 354 B1.

DE 16 53 617 C appears to be somewhat more closely connected to the invention. There, a tracking device is described for a cage of a swash plate pivot bearing, wherein parts thereof are provided with positive-locking elements. For this purpose, the segment-like cage is provided with a rotating pinion, which meshes with bent teeth segments that are fixed with screws, on one side, in the housing and, on the other side, to the sides of the swash plate.

All of these tracking devices have the common disadvantages that they have a complicated construction, they are made from many components, and they require additional installation space. Another reason is that the connections have either projections extending perpendicular and into corresponding boreholes in the swash plate and in the housing or openings that slide on pivot pins, which extend perpendicular from the swash plate and the housing. In both cases, the connections are installed after the swash plate was installed, which requires an access opening in the side of the housing. The opening must then be covered by a removable cover with a type of seal between the housing and the cover. Providing an access opening, the cover, and the seal further increases such a pivot bearing.

Indeed, roller bodies provided with positive-locking elements are also already known, as U.S. Pat. No. 3,938,865 shows. The means-effect relationships described there, however, are completely different in comparison with the invention. The cylindrical or conical rollers shown in this document have teeth at opposing ends for preventing slip. It is a long-known problem in roller-bearing technology that the friction fit between the inner ring, roller bodies, and outer ring is lost in the unloaded zone. In this zone, the roller bearings reduce their rotational speed. When entering the load zone, they must then be accelerated again abruptly, so that the normal roll-off process can proceed. This causes wear in the roller bodies in the load or acceleration zone, in particular, at a certain load and rotational speed ratio.

SUMMARY

Starting with the disadvantages of the known state of the art, the invention is based on the objective of structurally simplifying a swash plate pivot bearing of the construction specified above.

According to the invention, this objective is met in that the cage control is integrated in the roller-bearing segments, such that at least one cylindrical roller body engages with a positive fit with the hollow-cylindrical bearing surface and the cylindrical bearing surface.

Through the positive-fit connection between the roller bodies and both bearing surfaces, it is guaranteed that the cage including the roller body can no longer change its assumed optimal position after setting the desired pivoting. This at least one roller body with a different construction can also be viewed as a control roller body. In this connection, it has proven useful when such a profiled roller body is arranged on both ends of the roller-bearing segment. These can also be load free, so that they have a smaller diameter than the other, non-profiled, supporting roller bodies. Finally, a roller bearing with an increased roller resistance is formed, which prevents the cage from slipping from its most favorable position. As already discussed, this sliding movement always occurs when forces caused by pivoting movements or vibrations act on the roller-bearing segments. This prevents the cage and the supporting roller bodies from wandering from the gap between the swash plate and the housing and prevents damage to connection parts, such as, for example, pistons or sliding blocks. The invention also significantly simplifies the swash plate pivot bearing in production and assembly, because complicated arrangements for tracking the cage are no longer necessary. Consequently, no additional parts have to be produced and connected to the pivot cradle bearing in a complicated way.

Additional advantageous embodiment variants of the invention are described in the subordinate claims.

For example, in one embodiment it is provided that the roller body is provided with teeth and the two bearing surfaces are provided with associated counter teeth, wherein the roller body is provided with peripheral teeth on the two opposing ends in the axial direction, or in its center part.

Attaching the teeth forming the positive connection between the roller body and bearing surfaces is relatively uncomplicated relative to the production of the previously known tracking devices and ensures, in particular, that significant space savings can be realized relative to the known and expensive tracking devices.

According to another additional feature, both the hollow-cylindrical bearing surface and also the cylindrical bearing surface should be formed by bearing shells inserted in the housing and on the swash plate. These bearing shells can be produced easily as an add-on part and ensure that both the swash plate and also the housing are not to be provided with expensive positive-locking elements. Here, it has proven advantageous when the bearing shells are constructed as parts formed without cutting and have two sets of counter teeth spaced apart from each other in the axial direction.

According to another additional feature of the invention, the bearing shells should be provided at least on one end with a radial directed rim. In this way the segment-like cage including the held roller body is easily prevented from sliding out of the bearing shells in the axial direction.

According to another feature of the invention, this rim should be provided with counter teeth.

In an improvement of the invention, it is provided that the bearing shells are provided on their peripheral ends with positioning projections angled inward or outward in the radial direction. In this way, their uncomplicated connection to the swash plate and to the housing is realized, in that these positioning projections engage in corresponding recesses on the swash plate and on the housing.

A full-type construction, i.e., one without a cage, is also provided. According to this variant of the invention, all of the cylindrical roller bodies should be in positive engagement with the hollow-cylindrical bearing surface and the cylindrical bearing surface in the already described way. The advantage here lies in that due to the lack of a cage, more roller bodies can be arranged, so that the load rating is increased.

The invention is explained in more detail in the following embodiments.

BRIEF DESCRIPTION OF THE DRAWINGS

Shown are.

DETAILED DESCRIPTION OF THE PREFERRED EMBODIMENTS

Figure 9:
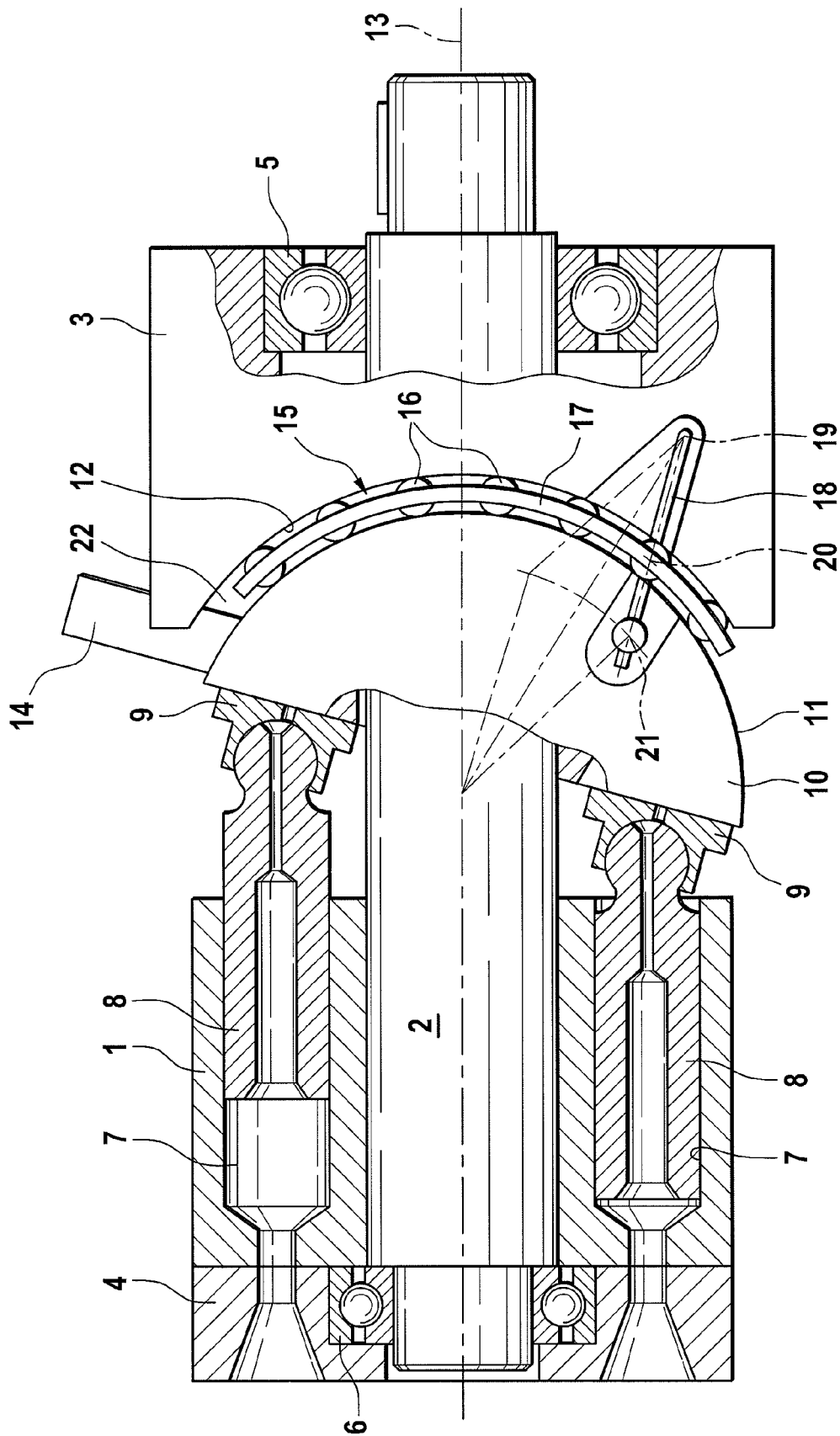

For representing and explaining the overall relationship of a swash plate bearing in the form of an axial piston machine, reference is first made to FIG. 9. According to this, the axial piston machine includes a cylinder drum 1, which is arranged on a shaft 2, wherein the shaft 2 is a drive shaft or a driven shaft according to the use of the machine as a pump or as a motor. The shaft 2 is supported by bearings 5 and 6 in a housing including the housing parts 3 and 4. Within the cylinder drum 1, there are pistons 8, which are supported on a swash plate 10 via sliding blocks 9, within cylinder boreholes 7. The swash plate 10 has a cylindrical bearing surface 11, which is opposite a hollow-cylindrical bearing surface 12 in the housing part 3. Both are set apart from each other by the bearing gap 22. The stroke of the piston 8 in the cylinder boreholes 7 is set in a known way by changing the angular position of the swash plate 10 relative to the axis 13 of the shaft 2. For this purpose, a not-shown adjustment device attaches, for example, to the lever 14 connected rigidly to the swash plate 10. In the bearing gap 22 between the bearing surfaces 11 and 12 there is a roller-bearing segment 15, whose roller bearings 16 are guided and held by a cage 17. Another roller-bearing segment 15 is arranged in a not-visible way away from this cage, so that the swash plate 10 is doubly supported. The tracking device consists of an elastic rod 18, which is supported so that it can pivot in the housing part 3 on a fixed bearing point 19 and which is supported so that it can pivot on a bearing point 20 on the cage 17 and can move in its longitudinal direction and which is supported so that it can pivot on the swash plate 10 on a bearing point 21 and can move in its longitudinal direction. Now if the swash plate 10 changes its position with the help of the lever 14, then the roller-bearing segment 15 is carried along by means of the elastic rod 18, so that it always assumes an advantageous position in the bearing gap 22, i.e., is oriented in the direction of force. As already described in detail in the state of the art, such a tracking device requires increased production and assembly expense.

Here is where the invention sets in.

Figure 3:
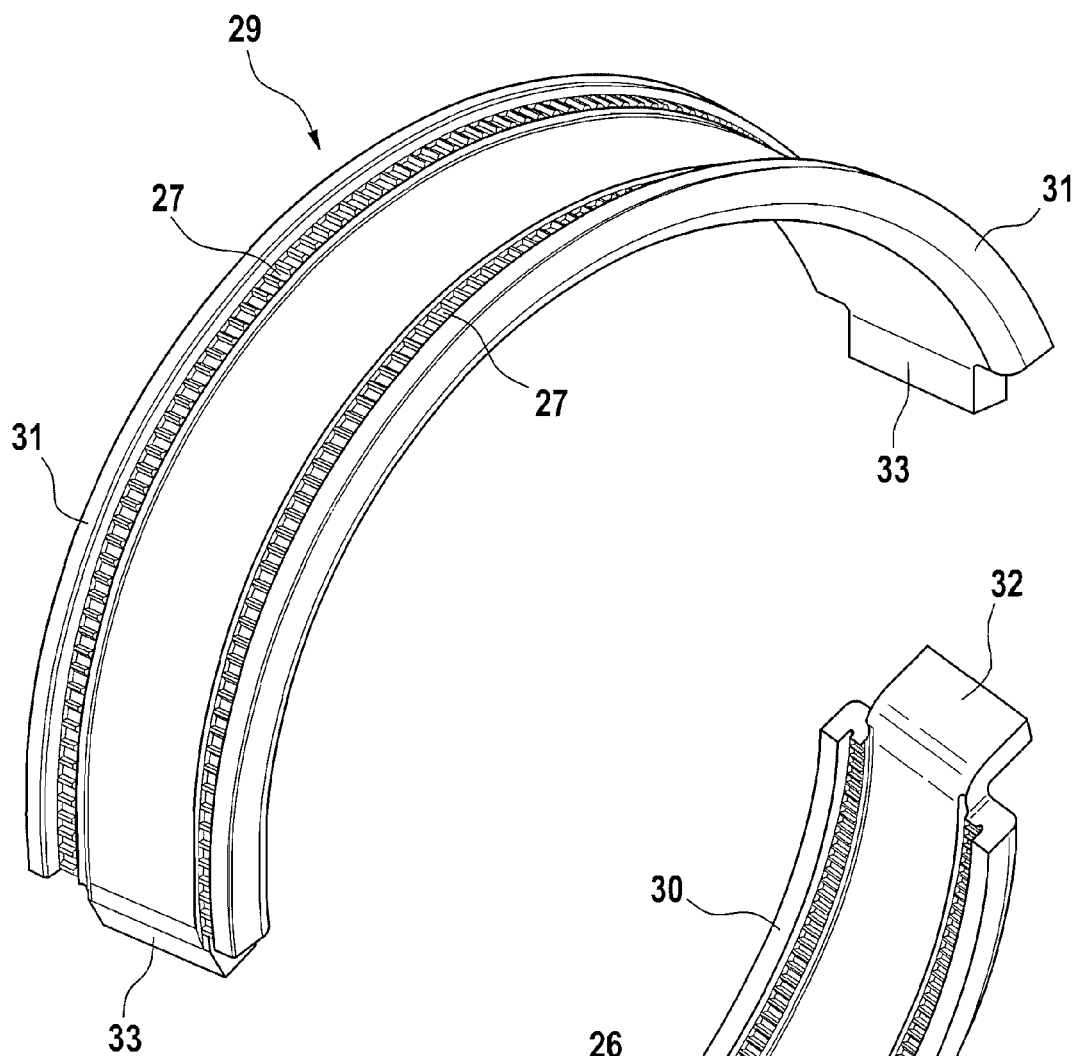
Figure 4:
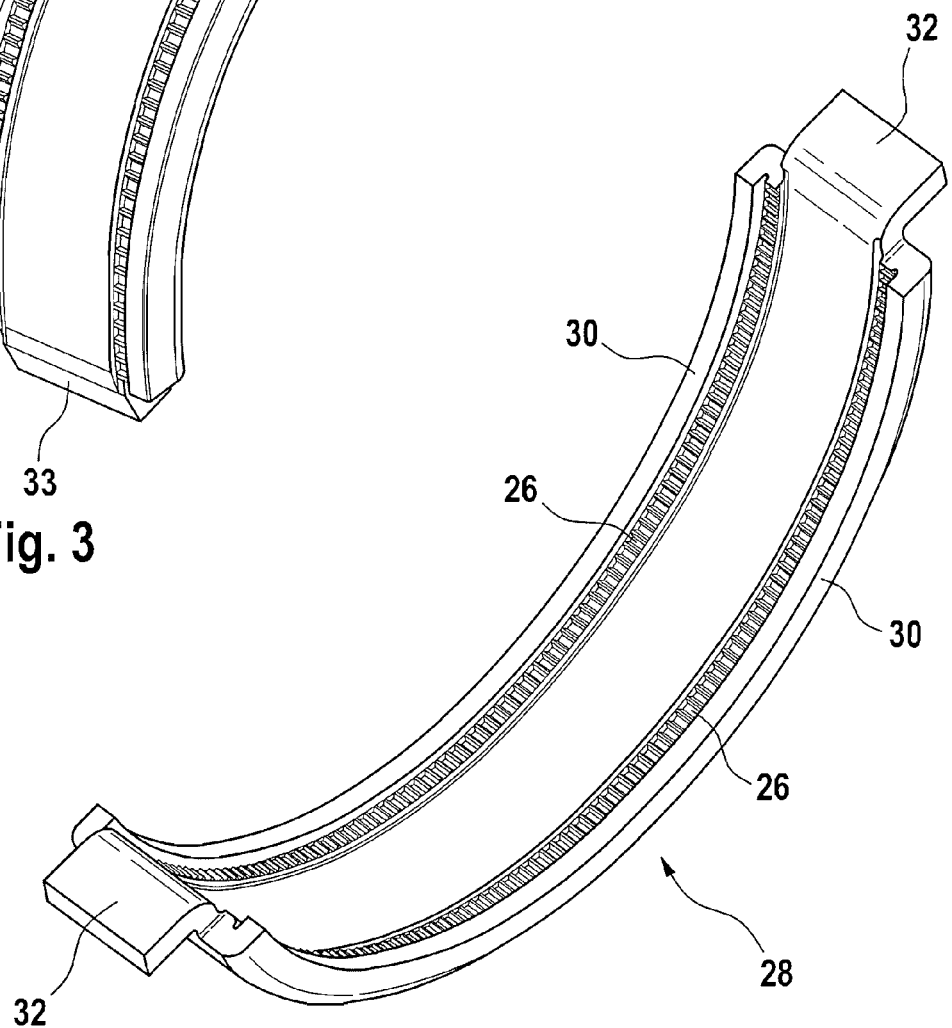
Figure 5:
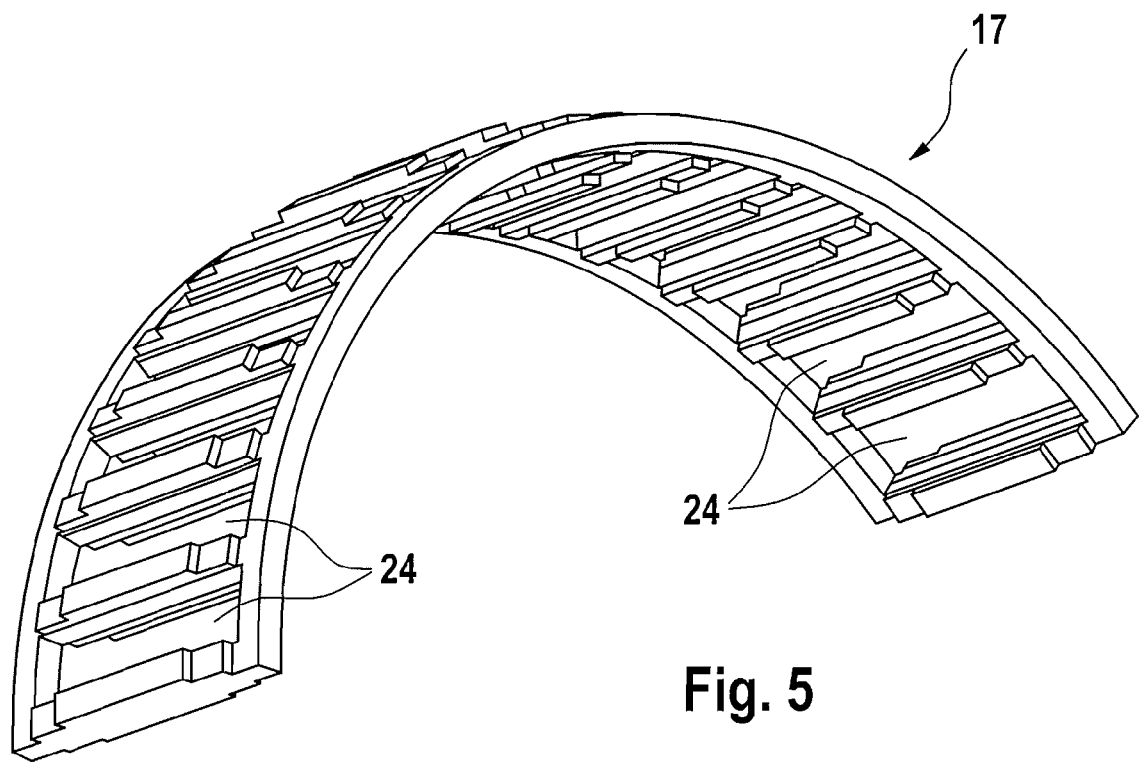
Figure 6:
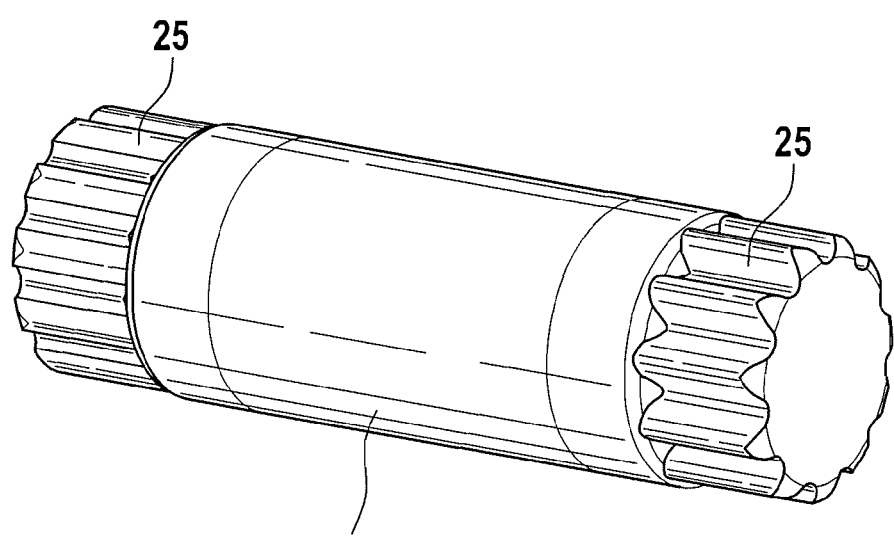

As can be seen from the FIGS. 1 to 6, just like in the prior state of the art, the roller-bearing segment 15 includes the cage 17 with the pocket 24, in which, however, roller bodies 23, 23.1, 23.2 are held in contrast to the state of the art. These roller bodies are in positive engagement with the hollow-cylindrical bearing surface 12 and the cylindrical bearing surface 11. According to FIG. 6, the roller bodies 23, 23.1, 23.2 are provided on their two opposite ends with peripheral teeth 25. These engage with the associated counter teeth 26, 27, which are set, on one side, by the bearing shell 28 and, on the other side, by the bearing shell 29. Both bearing shells 28, 29 are produced as parts formed without cutting and have two sets of counter teeth 26, 27, which are spaced apart from each other in the axial direction and which fit teeth 25 of the roller bodies 23, 23.1, 23.2 arranged on both sides. As FIGS. 3 and 4 show, the bearing shell 29 connected to the swash plate 10 is provided with a rim 31 on both sides directed outward in the radial direction, while the bearing shell 28 arranged in the housing 3 is equipped with a rim 30 directed inward in the radial direction. In addition, the bearing shell 29 is provided with positioning projections 33 directed inward in the radial direction, while the positioning projections 32 for the bearing shell 28 are directed outward. The positioning projections 33 of the bearing shell 29 engage in a not-shown position, in a recess of the swash plate 10, while the positioning projections 32 of the bearing shell 28 also engage in the housing part 3 in a similarly not-shown way. In this way, a simple connection between the bearing shells 28, 29 and the housing part 3 or swash plate 10 is given. In the embodiment according to FIGS. 1 to 6, the roller-bearing segment 15 is constructed so that all of the roller bearings arranged in the cage 17 are constructed as roller bodies 23, 23.1, 23.2 with peripheral teeth 25. For the functioning of the solution according to the invention, this needs to be only for one roller body, as FIGS. 7 and 8 show.

Figure 7:
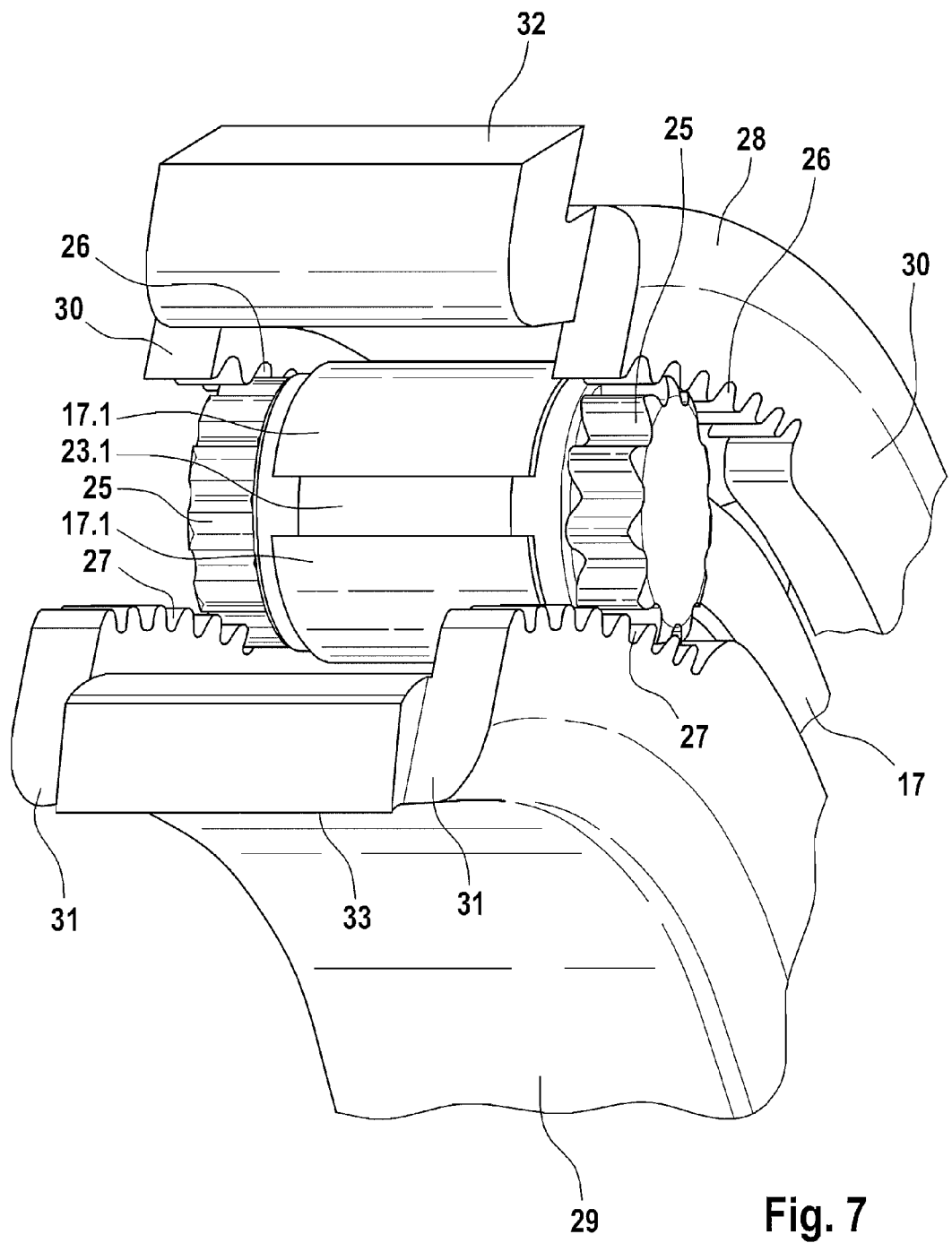

As FIG. 7 shows, the first roller body 23.1 and the second roller body 23.2, which, however, is not shown, are provided at the beginning and end of the roller-bearing segment 15 with teeth 25 surrounding the two opposing ends in the axial direction and engaging with the counter teeth 26, 27 in positive engagement. As is visible, the counter teeth 26, 27 are arranged on the rims 30, 31 of the bearing shells 28, 29. The rims 30, 31 of the bearing shells 28, 29 are provided with the counter teeth 26, 27 not over their entire peripheral extent, but instead only at the beginning and end of the roller-bearing segment 15, so that pivoting about the pivot angle α can be realized.

Figure 8:
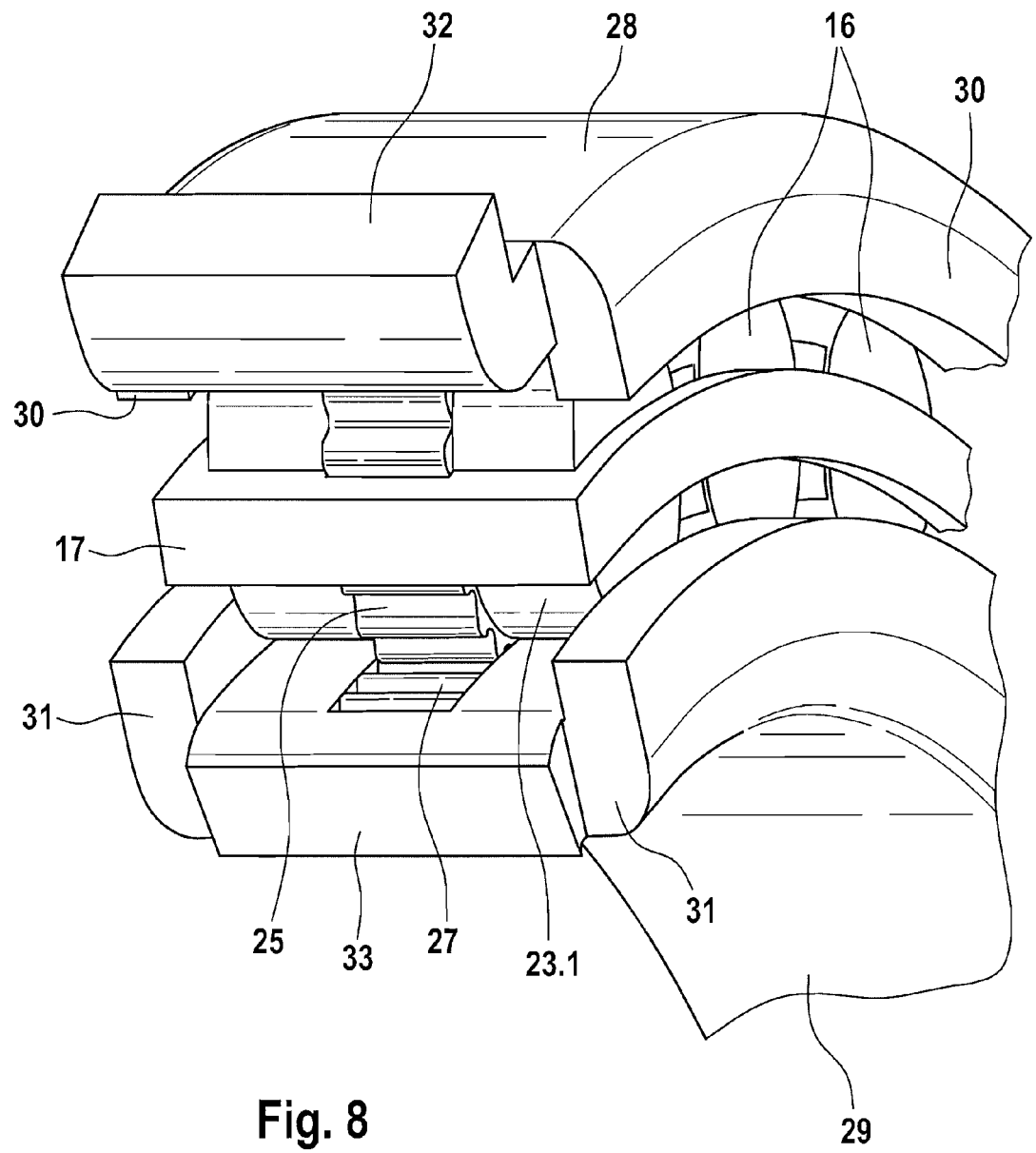

This swash plate pivot bearing shown in FIG. 8 is distinguished in that the roller body 23.1 is provided in its center part with the teeth 25, which engages, in turn, with the counter teeth 26, 27 in a positive engagement.

The effect of the cage control according to the invention is explained in more detail below with reference to FIG. 1:

In the mentioned figure, both bearing shells 28, 29 arranged relative to each other so that they can pivot at the point 34 are set so that they assume the same position relative to this point. In this position, however, a hydraulic axial piston machine would not be operable, because the bearing plate 29 connected to the not-shown swash plate 10 is not pivoted. In this case, the pistons 8 could not execute an up and down movement in the axial direction within the rotating cylinder drum 1, which, however, is irrelevant for the explanation of the invention.

Figure 1:
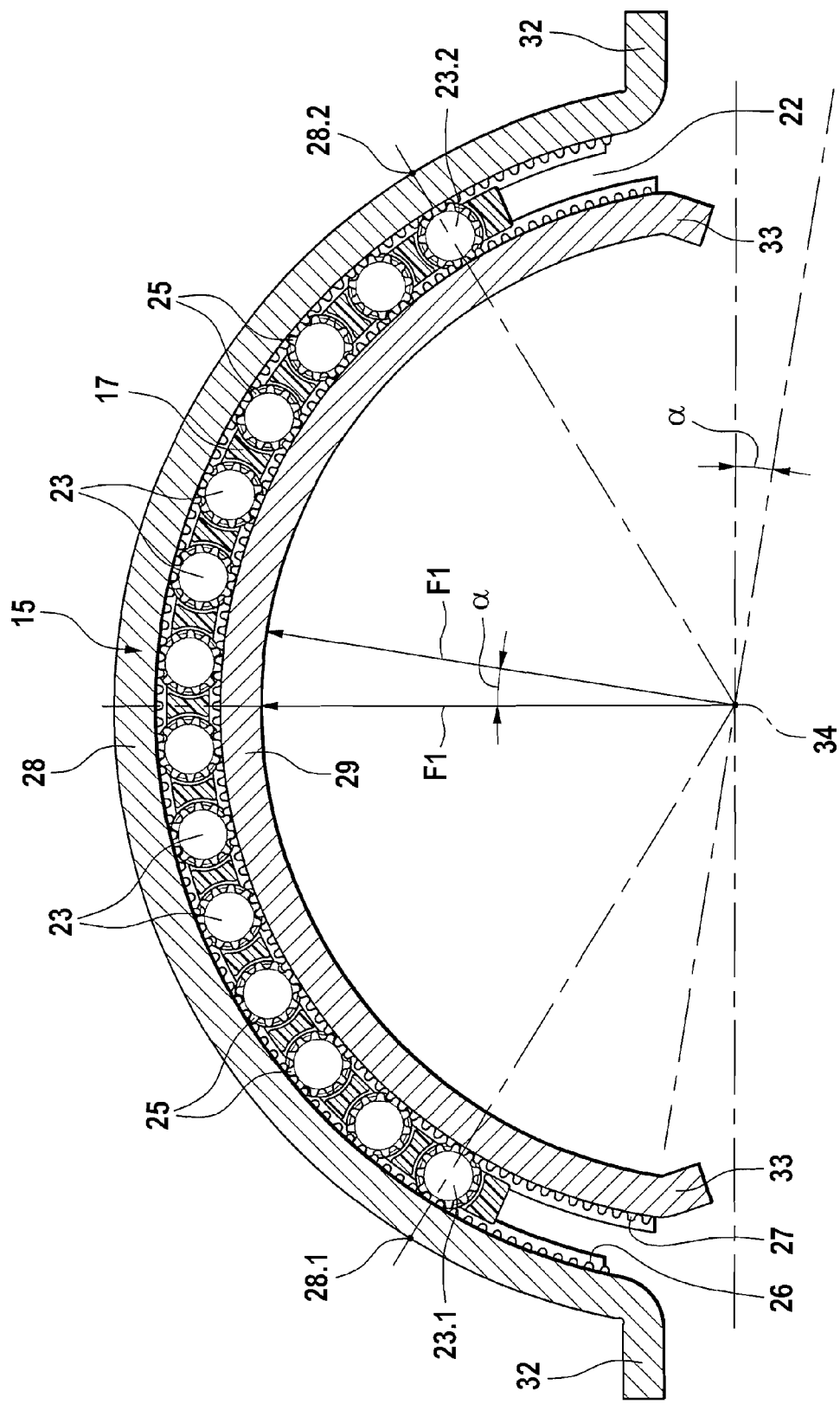
FIG. 1 a longitudinal sectional view through a swash plate bearing according to the invention, FIG. 2 an enlarged representation of a detail from FIG. 1, FIG. 3 a perspective view of a bearing shell arranged on the swash plate with cylindrical bearing surface, FIG. 4 a perspective view of a bearing disk arranged in the housing with hollow-cylindrical bearing surface, FIG. 5 a perspective view of a segmented cage, FIG. 6 an enlarged view of a roller body in positive engagement, FIGS. 7, 8 a detail view taken from a perspective view of a swash plate bearing, and FIG. 9 a longitudinal section view through an axial piston machine according to the prior state of the art.
Figure 2:
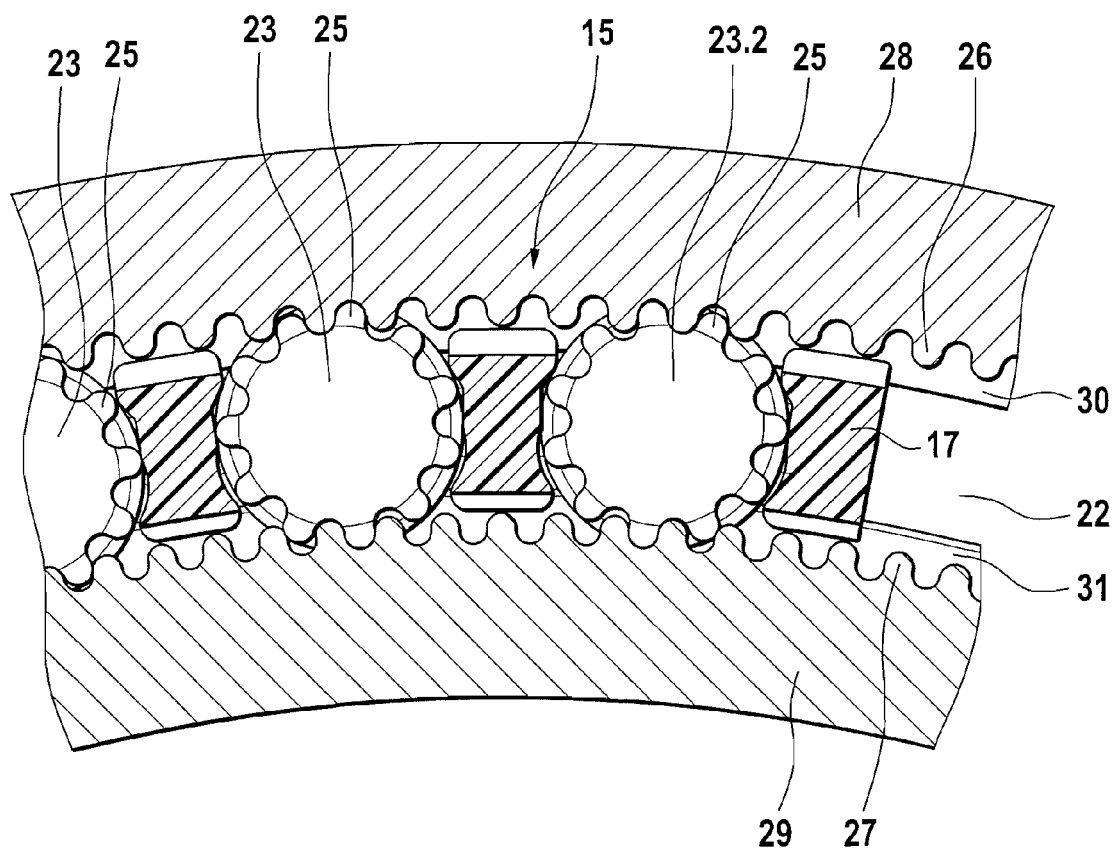

As FIG. 1 further shows, the force F1 originating from point 34 is supported via a segment, which is bounded on the left side by the point 28.1 and on the right side by the point 28.2 of the bearing shell 28, wherein the beginning and the end of the segment run through the center point of the cylindrical roller bodies 23.1 and 23.2. Now, as shown in the figure, if the swash plate 10 and thus the bearing shell 29 connected to it is shifted by the angle α in the peripheral direction relative to the bearing shell 28 arranged rigidly, then the roller-bearing segment 15 moves by the same amount, i.e., the points 28.1 and 28.2 are similarly shifted by the same amount in the clockwise direction. In this way, it is guaranteed that the force F1 is supported by exactly the same segment, but shifted by an amount, after the pivoting of the swash plate 10 with the bearing shell 29 by the angle α. Wandering of the cage segment 15 from the bearing gap 22 due to vibrations and/or shocks is prevented by the positive-fit connection between the roller bodies 23, 23.1, 23.2 and their teeth 25 with the associated counter teeth 26, 27 of the bearing shells 28, 29.

REFERENCE SYMBOLS

1 Cylinder drum
2 Shaft
3 Housing part
4 Housing part
5 Bearing
6 Bearing
7 Cylinder borehole
8 Piston
9 Sliding block
10 Swash plate
11 Cylindrical bearing surface
12 Hollow-cylindrical bearing surface
13 Axis
14 Lever
15 Roller-bearing segment
16 Roller body
17 Cage
17.1 Retaining projection
18 Elastic rod
19 Bearing point
20 Bearing point
21 Bearing point
22 Bearing gap
23 Roller body
23.1 Roller body
23.2 Roller body
24 Pocket
25 Teeth
26 Counter teeth
27 Counter teeth
28 Bearing shell
28.1 Point
28.2 Point
29 Bearing shell
30 Rim
31 Rim
32 Positioning projection
33 Positioning projection
34 Point
α Pivot angle

The invention claimed is:

1. Swash plate pivot bearing for a hydraulic axial piston machine of variable throughput volume, comprising roller-bearing segments, which are held in arcuate cages, are arranged between a hollow-cylindrical bearing surface for a swash plate in a housing and a cylindrical bearing surface on the swash plate cage control elements are provided, which prevent the cage holding the roller bodies from slipping out of a predetermined position in the pivot bearing, the cage control elements are integrated in the roller-bearing segments by at least one cylindrical roller body engaging with the hollow-cylindrical bearing surface and the cylindrical bearing surface with a positive engagement, the hollow-cylindrical bearing surface and the cylindrical bearing surface are each formed by a bearing shell inserted in the housing and on the swash plate, the bearing shells are constructed as parts formed without cutting and have two sets of counter teeth spaced apart from each other in an axial direction, the bearing shells are each provided on at least one axial end with a rim oriented in a radial direction, and the counter teeth are arranged on the rims.

2. Swash plate pivot bearing according to claim 1, wherein the at least one roller body is provided with teeth that engage with the counter teeth.

3. Swash plate pivot bearing according to claim 2, wherein the teeth on the at least one roller body are provided on the two opposing ends in an axial direction as peripheral teeth.

4. Swash plate pivot bearing according to claim 2, wherein the at least one roller body is provided on a center part thereof with peripheral teeth.

5. Swash plate pivot bearing according to claim 1, wherein the bearing shells are provided on peripheral ends thereof with positioning projections angled outwardly or inwardly.

6. Swash plate pivot bearing according to claim 1, wherein the roller bodies are cylindrically constructed and all of the roller bodies engage with the hollow-cylindrical bearing surface and the cylindrical bearing surface with a positive engagement.

7. Swash plate pivot bearing according to claim 6, wherein all of the roller bodies are provided with teeth that engage with the counter teeth.

* * * * *